United States Patent [19]

Wilbur et al.

[11] 4,397,439
[45] Aug. 9, 1983

[54] BRAKE ASSEMBLY FOR DENTAL TRAY SUPPORT ARM

[75] Inventors: Lawrence A. Wilbur; Stanley E. Gordon, both of Bay Minette, Ala.

[73] Assignee: Syntex (U.S.A.) Inc., Palo Alto, Calif.

[21] Appl. No.: 234,231

[22] Filed: Feb. 13, 1981

[51] Int. Cl.$^3$ .............................................. B61L 13/00
[52] U.S. Cl. .............................. 248/292.1; 248/123.1; 248/280.1; 248/281.1
[58] Field of Search ..................... 248/122, 123.1, 124, 248/276, 278, 279, 280.1, 281.1, 283, 284, 292.1, 282, 325

[56] References Cited

U.S. PATENT DOCUMENTS

| | | | |
|---|---|---|---|
| 201,876 | 4/1878 | Ewart | 248/281.1 |
| 510,147 | 12/1893 | Tarbox | 248/281.1 |
| 991,101 | 5/1911 | Smith | 248/281.1 |
| 1,515,442 | 11/1924 | Rankin | 248/281.1 |
| 2,650,680 | 9/1953 | Coombes et al. | 188/151 R X |
| 3,160,379 | 12/1964 | Gardella | 248/124 |
| 3,348,799 | 10/1967 | Junkel et al. | 248/283 |
| 3,436,046 | 4/1969 | Valeska | 248/284 |
| 4,234,060 | 11/1980 | Barsted | 188/44 |
| 4,266,747 | 5/1981 | Souder et al. | 248/280.1 |

*Primary Examiner*—J. Franklin Foss

*Attorney, Agent, or Firm*—David A. Lowin; John A. Dhuey; Joseph I. Hirsch

[57] ABSTRACT

A fluid actuated brake assembly for use with a parallelogram linkage on a dental tray support arm is described. Floating brake shoes positioned on opposite sides of one member of the parallelogram linkage with one of the brake shoes pivotably and slideably attached to the other member of the parallelogram linkage provides a braking and locking effect between the two members of the parallelogram linkage to provide an efficient brake for a dental tray support arm. Upon fluid actuation of the brake assembly, the brake shoes grip one member of the parallelogram and form a rigid connection with the other member of the parallelogram to prevent relative movement of the parallelogram linkage members. The frictional brake assembly also provides an override feature above a predetermined force level to prevent accidental jamming of the dental tray support arm against an object. Additionally, fluid actuation of the brake assembly provides for substantially instantaneous locking and unlocking of the dental tray support arm. The fluid actuation mechanism is conveniently operated by an air brake switch which is located near the dental tray.

42 Claims, 8 Drawing Figures

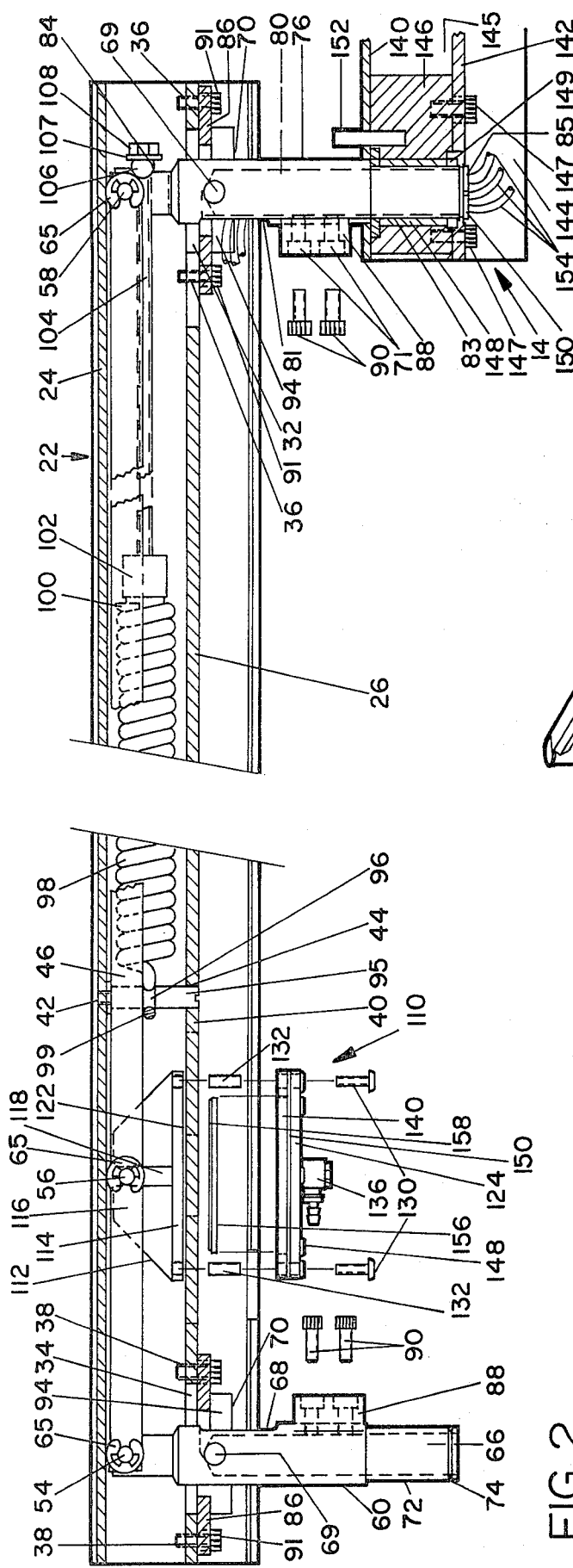
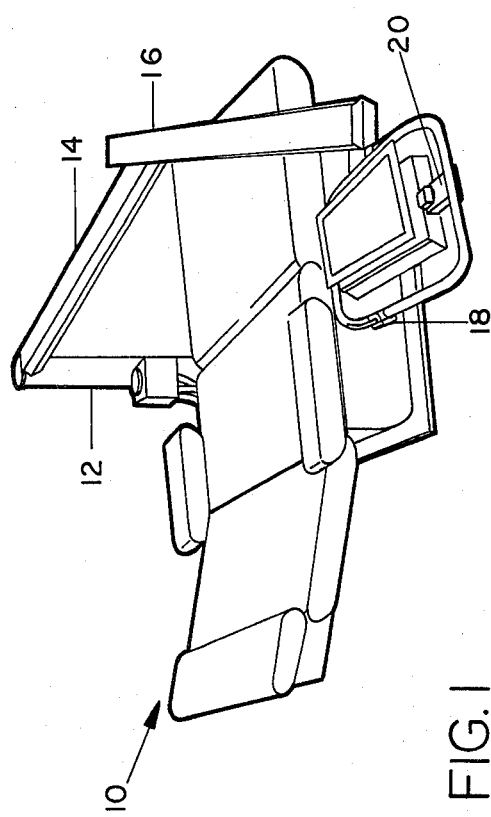
FIG. 2
FIG. 1

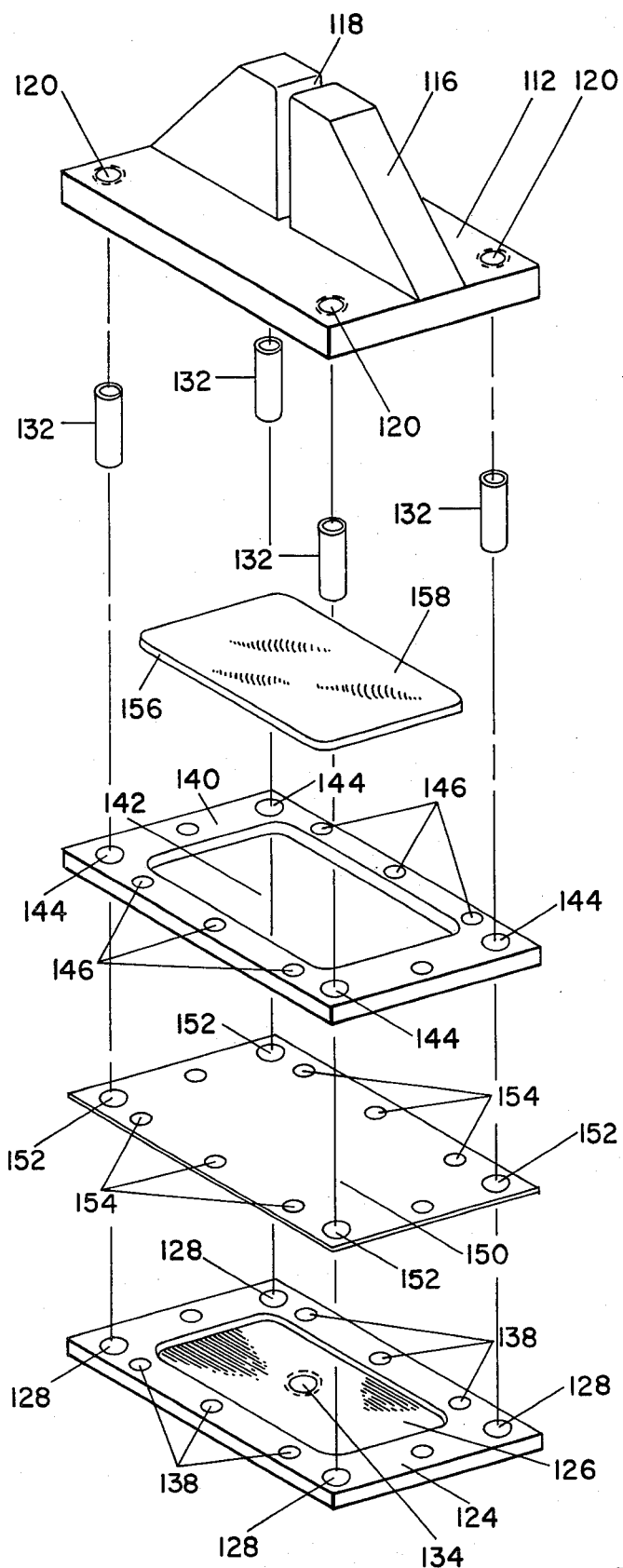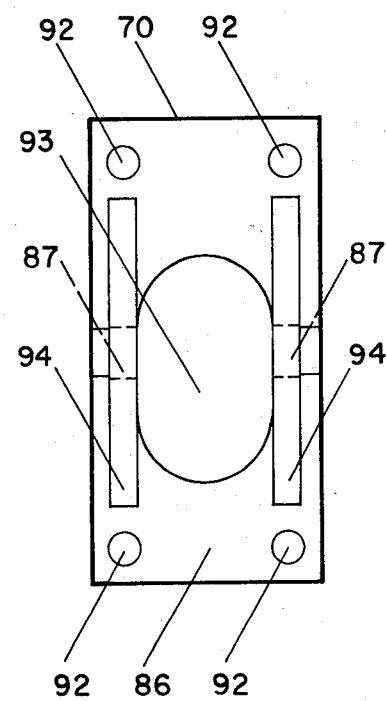
FIG. 6
FIG. 7

BRAKE ASSEMBLY FOR DENTAL TRAY SUPPORT ARM

BACKGROUND OF THE INVENTION

1. Field of the Invention

The present invention relates to brake systems for releasably locking parallelogram linkage support arms for supporting dental trays in a dental operatory. In particular, the present invention is directed to an air brake assembly to provide the aforementioned locking function.

2. State of the Art

Parallelogram linkages for supporting a dental tray horizontally at a multitude of vertical positions are conventional and old in the art. See for example U.S. Pat. Nos. Re. 8,723 and 171,746 issued to E. T. Starr, U.S. Pat. No. 466,464, issued to J. Hood et al and U.S. Pat. No. 1,050,672, issued to J. H. B. Macintosh. The Starr patents employ a ratchet mechanism and the Hood et al patent utilizes similar teeth-like projections and an engaging rod to prevent relative movement of the parallelogram linkage arms. More recently, U.S. Pat. No. 3,160,379, issued to J. M. Gardella describes a pawl mechanism for locking the parallelogram linkage members. Likewise, U.S. Pat. No. 3,237,902, issued to K. Hayashi utilizes a pawl mechanism for preventing pivotable movement of the parallelogram linkage members. In U.S. Pat. No. 4,082,244, issued to L. K. Groff, a threaded member is used to fix the relative position of the linkage arms of the parallelogram to prevent their movement.

While such systems can provide a useful function, they have not been found entirely satisfactory. Pawl and ratchet mechanisms operate in discrete increments and the transition of the support tray between different positions does not always take place smoothly. Unless such transition is smooth, instruments placed on the tray can be displaced or fall from the tray to areas where they may become contaminated and thus require cleaning before reuse. Additionally, actuation of such mechanisms which typically are enclosed in the support arm housing from remote locations is not conveniently provided for. Typically, two handed operation by the dental practioner is required. It usually is necessary for the dental practioner to hold the tray at the adjusted position with one hand while at the same time attempting to release or lock the particular locking mechanism provided in prior art devices. For example, as with the Groff mechanism, it is apparent that it is no easy task to hold a dental tray at a particular position while at the same time rotating the threaded locking mechanism which is provided in the support arm at a location remote from the dental tray. The actuating button of the Gardella device also is provided in the link arm. It is necessary then to support the dental tray with one hand while at the same time depressing the actuating button with the other hand to move the linkage arm to the desired position. The Hayashi device utilizes a remote actuation system with a relatively complex lever and rod mechanism to operate the pawl system.

Thus it is seen that there is a need for a simple locking and brake mechanism for parallelogram linkage arms for use with dental support trays which can be conveniently actuated from a remote location, particularly from a location on the dental tray itself. Additionally, since dentists and dental assistants work for many hours from trays supported near the patients, small variations in tray positions can greatly increase the fatigue factor involved in such work. Accordingly, it is desirable to have a tray support which is positionable at substantially an infinite number of positions, rather than at a few discrete position.

SUMMARY OF THE INVENTION

The present invention is directed to a brake assembly for use with a dental support arm having a pair of first and second parallel members which comprises means for releasably engaging a portion of the first of the parallel members, means connecting said engaging means to the second of the parallel members, and fluid operated means actuating said engaging means, whereby relative movement of the first and second parallel members is prevented when the actuating means causes the engaging means to engage the portion of the first of the parallel members.

In an illustrated embodiment, the invention comprises a first brake shoe which is adapted to engage the first of a pair of parallel members comprising a parallelogram linkage in a dental tray support arm, the brake shoe being pivotably attached to the second parallel member comprising the parallelogram linkage in a dental tray support arm, and fluid operated means for engaging the brake shoe with the first parallel member. In a further aspect of the invention, a top brake shoe and a bottom brake shoe are provided for gripping the first of the parallel members when actuated by the fluid operated means.

DESCRIPTION OF THE DRAWINGS

FIG. 1 is a view of a chair-mounted dental delivery system utilizing a tray support arm;

FIG. 2 is a side elevational view, partly in section, of a tray support arm illustrating the brake assembly of the present invention;

FIG. 6 is a bottom view of a pivot block used to attach the pivot posts to the housing;

FIG. 7 is an exploded view of the brake assembly; and

DETAILED DESCRIPTION OF THE INVENTION

Figure 3:
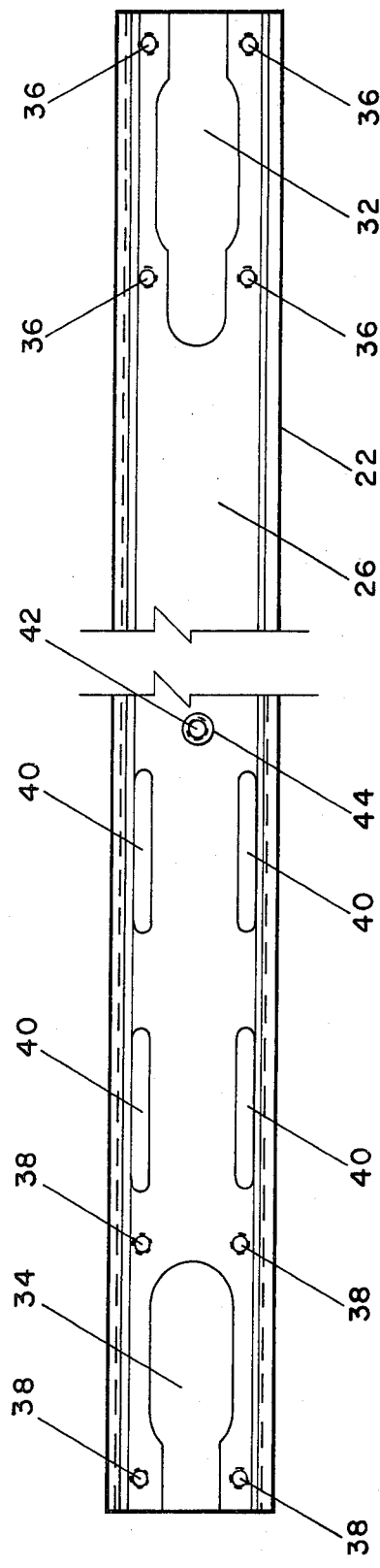
FIG. 3 is a bottom view of the housing of the support arm.
Figure 4:
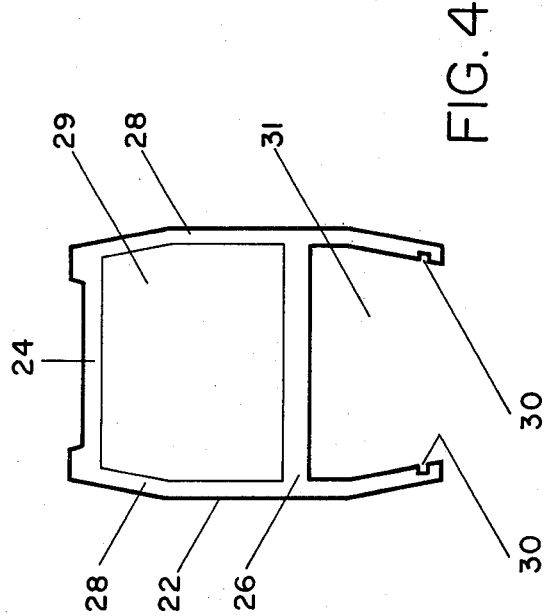
FIG. 4 is an end view of the housing of the support arm.
Figure 5:
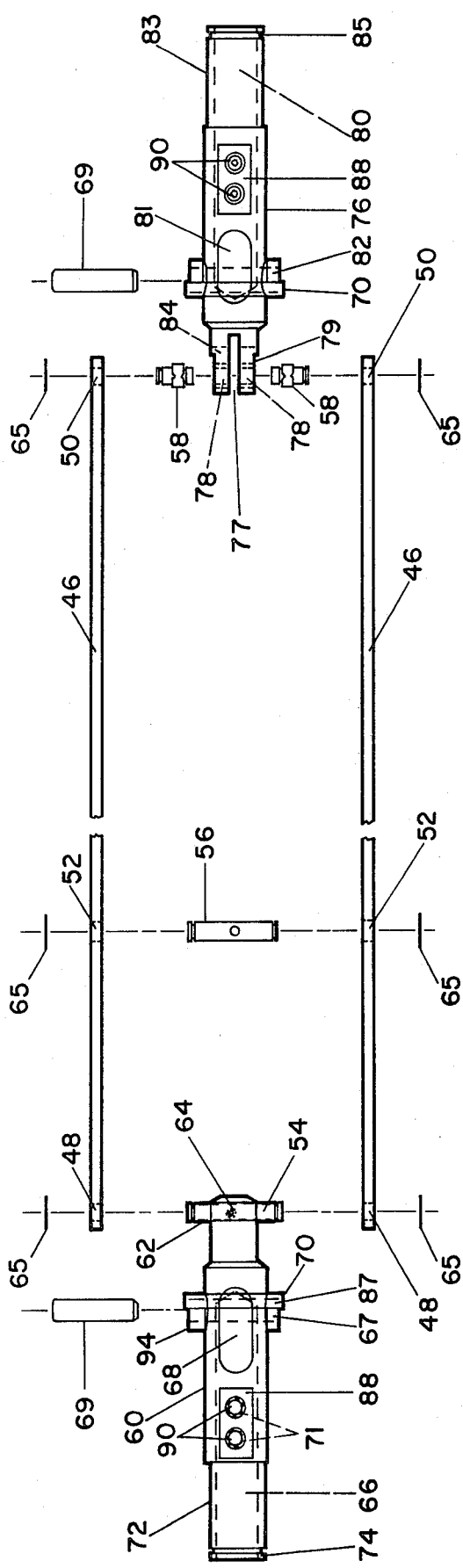
FIG. 5 is an exploded view of the parallel arms and pivot posts structure.

The brake assembly of the present invention is utilized with a dental tray support arm for horizontally supporting a dental tray in a variety of vertical positions. A typical chair-mounted support unit is illustrated in FIG. 1. As shown therein, a dental chair 10 has a support post 12 attached thereto. To support post 12 is connected a primary arm 14, which can be rotated about the end of support post 12. A dental tray support arm 16, commonly referred to as a flex-arm, is attached to primary arm 14 and supports a dental tray support arm and a dental tray 18. A brake switch 20, the purpose and function of which will be described below, is attached to a handle or other portion of the dental tray for easy accessibility by a dentist or dental assistant.

In order to horizontally support dental tray 18 at a variety of vertical positions, support arm 16 typically employs a parallelogram linkage. As shown in FIGS. 2-5, support arm 16 is comprised of a housing 22, having an elongate top member 24 and an elongate crosspiece 26 joined by a pair of vertical sides 28. Top member 24, crosspiece 26 and vertical sides 28 define an upper channel 29 which is substantially rectangular in cross-section. A pair of longitudinal grooves 30 are provided near the bottom of vertical sides 28 to retain a lower panel (not shown) which can be slid into grooves 30 to form a closed lower channel 31.

Crosspiece 26 forms one of the parallel members of the parallelogram linkage of suppot arm 16. The additional members of the parallelogram linkage are provided by a pair of parallel arms 46 and a pair of pivot posts 60 and 76. The pair of parallel arms 46 and crosspiece 26 form the upper and lower parallel members of the parallelogram linkage and the pair of pivot posts 60 and 76 form the side parallel members of the linkage.

Pivot post 60 is pivotably attached to parallel arms 46 by a pin 54 which is located in a bore 62 in the top end of pivot post 62. Pin 54 passes through hole 48 in the ends of parallel arms 46 and is attached thereto by snap rings 65. A set screw 64 is provided to prevent sideways movement of pin 54 in pivot post 60.

The opposed ends of parallel arms 46 are pivotably attached to pivot post 76 by a pair of retainers 58 which are each threaded at one end thereof for threaded engagement with holes 78 provided in the ears 79 at the top end of pivot post 76. The other end of each of retainers 58 is formed with a pin-like projection which passes through holes 50 in the ends of parallel arms 46. Snap rings 65 are provided to retain parallel arms 46 on retainers 58.

Parallel arms 46 and the top end of pivot posts 60 and 76 locate within upper channel 29 of housing 22. Pivot post 60 is located in and passes through an opening 34 provided in crosspiece 26 of housing of 22. Pivot post 60 is attached to crosspiece 26 by means of a pivot block 70 by screws 91, which pass through holes 92 in the base 86 of pivot block 70 and are threadedly received in threaded holes 38 formed in crosspiece 26. Pivot block 70 is pivotably attached to pivot post 60 by means of a pin 69 which passes through a bore 67 in pivot post 70 and a bore 87 extending through base 86 and upright members 87 of pivot block 70. An opening 93 is provided in base 86 of pivot block 70 to accommodate pivot post 60 during subsequent movement of the linkage element.

In a similar manner, pivot post 76 is located within and opening 32 provided in crosspiece 26. Pivot post 76 is attached to crosspiece 26 by means of pivot block 70 with screws 91 which pass through holes 92 in base 86 and are threadedly received in holes 36 provided in crosspiece 26. Pin 69 attaches pivot block 70 to pivot post 76 in the manner described above with respect to pivot post 60.

It can be seen most clearly from FIG. 2 that parallel arms 46 and crosspiece 26 form upper and lower members of a parallelogram linkage. That portion of pivot post 60 between pins 54 and 69 and that portion of pivot post 76 between retainers 58 and pin 69 form the side members of the parallelogram linkage.

Pivot post 76 has a lower end 83 of reduced diameter which is adapted to be attached to primary arm 14. Primary arm 14 can be formed with a top member 140, a crosspiece 142 and connecting side members 144 to define an upper channel 145. Positioned within and at the end of upper channel 145 is a mounting block 146 which is attached by means of screws 147. Mounting block 146 is bored to receive a bushing 148 in which is supported lower end 83 of pivot post 76. A washer 149 is provided at the lower end of bushing 148 and a snap ring 150 is positioned within groove 85 to retain pivot post 76 on primary arm 14.

Pivot post 76 is formed with a longitudinal bore 80 and an opening 81 to accommodate supply tubing 154 to carry working fluids to the tray area. Supply tubing passes from the lower channel of primary arm 14 upwardly through longitudinal bore 80, through opening 81 into lower channel 31 of housing 22. The tubing is routed through lower channel 31 to the tray support end of the assembly and passes through opening 68 and longitudinal bore 66 provided in pivot post 60.

Pivot post 60 is attached to a tray arm (not shown) at its lower end 72 in a similar manner as described for the attachment to the primary arm. Groove 74 is provided at the end of pivot post 60 for receiving a snap ring to retain pivot post 60 on the tray arm.

Primary arm 14 is provided with a stop pin 152 which is pressed into mounting block 146. A similar stop pin (not shown) is provided on the tray arm at the opposite end of the support arm assembly. Stop blocks 88 are attached to each of pivot posts 60 and 76 by screws 90 which engage threaded holes 71 in each of the pivot posts. Stop blocks 88 and stop pins 152 are located so as to interfere with each other and prevent 360° rotation of the pivot posts 60 and 76. That feature prevents undue twisting of tubing 154 at each end of the support arm assembly.

It is readily seen from FIG. 2 that as so far described the parallelogram linkage is free to pivot about retainer 58 and pin 69 at the primary arm end and pins 54 and 69 at the tray support end of the assembly. In order to counteract downwardly directed forces at the tray support end of the assembly created by the weight of tray 18 and objects placed thereon, a tension spring 98 is provided. Spring 98 is connected at its one end 99 to a retaining pin 95, which is located between upper member 24 and crosspiece 26 of housing 22. Retaining pin 95 is threaded at one end to fit into a threaded hole 42 provided in upper member 24 and its other end is retained in a hole 44 formed in crosspiece 26. A groove 96 is conveniently provided to receive hooked end 99 of spring 98. The other end 100 of spring 98 is attached to a block 102 having an internally threaded hole in which is threaded into one end of a threaded rod 104. The other end of rod 104 passes through a slot 77, formed by ears 79 of pivot post 76 and a pivot tensioner 106 and is retained thereon by washer 107 and nut 108. Pivot tensioner 106 is substantially ball-shaped on one side thereof and mates with a corresponding concave surface 84 formed on pivot post 76. By adjusting nut 108 on threaded rod 104, it is possible to control the tension in spring 98 and adjust the counteractive forces necessary to support a dental tray at the end of the support arm assembly.

The brake assembly 110 of the present invention is most clearly illustrated in FIGS. 2 and 7. A top brake shoe 112 is located within upper chamber 29 of housing 22 and rides on or floats on a portion of crosspiece 26 in the area of slots 40. Brake shoe 112 is formed with a generally planar base 114 from which extend a pair of upright projections 116 defining a slot 118 therebetween. The bottom surface 122 of base 114 is formed of a material having a high coefficient of friction such as rubber, neoprene or the like. Upright projections 116 serve to locate brake shoe 112 between parallel arms 46. Shoe 112 is retained in that position by a pin 56, which extends between parallel arms 46 through holes 52, and is slideably and pivotally received within slot 118. Snap rings 65 serve to retain pin 56 on parallel arms 46. Shoe 112 thus can move upwardly and downwardly relative to pin 56 and can also pivot about that point.

Opposed to top brake shoe 112 on the other side of crosspiece 26 is a lower brake shoe 156, which is formed with a surface 158 of material having a high coefficient of friction, such as rubber, neoprene or the like. Shoe 156 floats or rides within a spacer plate 140, which is provided with an opening 142 to receive shoe 156, and a flexible diaphragm 150. Diaphragm 150 is fastened between spacer plate 140 and a brake cap 124 by means of screws 148, which pass through holes 138 and 154 in brake cap 124 and diaphragm 150, respectively, and which are threaded into holes 146 in spacer plate 140.

Brake cap 124 is provided with a recess 126 which underlies opening 142 in spacer plate 140. A threaded hole 134 is provided at the bottom of recess 126 to receive a fitting connector 136 which is attached to brake switch 20 and through which pressurized air is provided to the brake assembly.

Brake assembly 110 is interconnected by screws 130 which pass through holes 128 in brake cap 124, holes 152 in diaphragm 150 and holes 144 in spacer plate 144. Spacer elements 132 are provided about screws 130 between spacer plate 140 and top brake shoe 112. Each spacer element 132 passes through a slot 40 provided in crosspiece 26 of housing 22. When screws 130 are threaded into threaded holes 120 of shoe 112, the brake assembly components are fastened together, but spacer elements 132 prevent shoes 112 and 156 from being drawn tightlyy against crosspiece 26. Accordingly, unless pressurized air is applied to brake assembly 110, shoes 112 and 156 float or ride on crosspiece 26 and the support arm 14 can be moved upwardly and downwardly with no braking action being imposed thereon.

Figure 8:
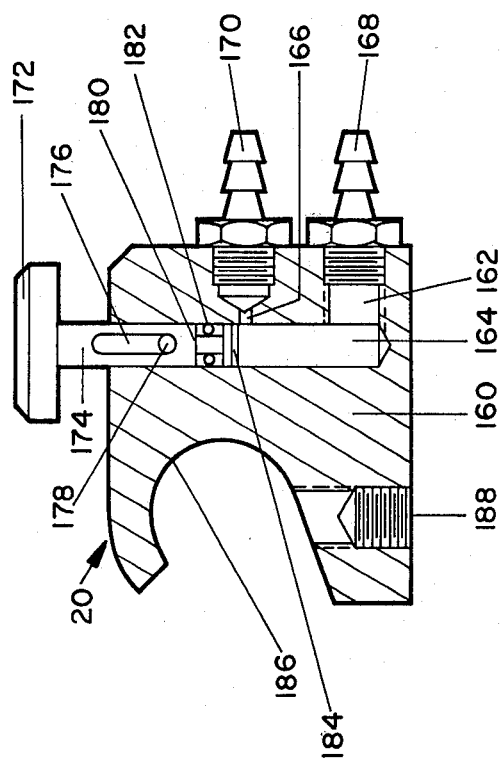
FIG. 8 is a cross-sectional view of a brake switch utilized with the present invention.

Pressurized air is supplied to brake assembly 110 from a source (not shown), such as a pump or compressor located in the dental operatory, through brake switch 20 which is conveniently located on a handle portion of dental tray 18. Brake switch 20, as illustrated in FIG. 8, has a body 160 formed with a pair of horizontal bores 162 and 166 interconnected by a vertical bore 164, which extends from bore 162 out through the top of body 160. Within bores 162 and 166 are located a pair of connector fittings 168 and 170, respectively. Connector fitting 170 is in fluid communication with fitting 136 attached to brake cap 124. Connector fitting 168 is in fluid communication with a source of pressurized air.

Located within bore 164 of body 160 is a stem 174 provided with a cap 172 at the top end and an O-ring 182 located within a groove 180 to provide a seal in bore 164 at the lower end of stem 174. Stem 174 has a longitudinally extending slot 176 in which is located a pin 178. Stem 174 can move reciprocally within bore 164 to the extent that its travel is not prevented by pin 178.

Brake switch 20 conveniently is formed with an opening 186 configured to mate with a typically cylindrically shaped handle provided on a dental tray 20. A set screw 188 is provided to retain brake switch 20 on the handle.

In normal operation, pressurized air supplied through connector fitting 168 to brake switch 20 exerts pressure on the bottom surface 184 of stem 174. That pressure forces stem 174 upwardly until the bottom of slot 176 is in contact with pin 178. As can best be seen in FIG. 8, bottom surface 184 and seal 182 then are above bore 166 and pressurized air can flow from bores 162 and 164 through bore 166 to fitting connector 136 on brake assembly 110.

Pressurized air then flows through hole 134 in brake cap 124 into recess 126 and forces diaphragm 150 upwardly. That force causes diaphragm 150 to push bottom brake shoe 156 against the bottom side of crosspiece 26. At the same time, the pressurized air in recess 126 forces brake cap 124 downwardly. Brake cap 124 bears on screws 130, which are connected to top brake shoe 112, and causes top shoe 112 to move downwardly to engage the upper surface of crosspiece 26. Crosspiece 26 is engaged by or gripped between top brake shoe 112 and bottom brake shoe 156 and surfaces 122 and 158, respectively, located thereon.

That engagement or gripping action forms a rigid connection between parallel arms 46, which constitutes one parallel member of the parallelogram linkage, and crosspiece 26 which constitutes the other parallel member of the linkage. Since parallel arms 46 and crosspiece 26 cannot move relative to each other, support arm 14 is effectively locked in the position it occupied when brake assembly 110 was actuated.

In order to release brake shoes 112 and 156 from engagement with crosspiece 26, cap 172 of brake switch 20 is pushed downwardly to move stem 174 to a position whereat O-ring 182 is between bore 162 and bore 166. In that position, pressurized air in the brake line extending from connector 170 to brake assembly 110 is bled off around stem 174 and diaphragm 150 relaxes to release brake shoes 112 and 156. When stem 174 is depressed, pressurized air cannot flow from bore 162 to bore 166 because of the O-ring seal located there between.

When stem 174 is pressed downwardly and brake assembly 110 is relieved of pressure, support arm 14 can be moved upwardly and downwardly to any desired position and the parallelogram linkage described above will maintain tray 18 in a horizontal position. As soon as cap 172 and stem 174 are released, air pressure acting on bottom surface 184 forces stem 174 upwardly and pressurized air again is provided to brake assembly 110 by connection with bore 166. Thus, the locking mechanism of this invention can be considered to be normally on.

Because brake assembly 110 is fluid actuated, it is possible to locate brake switch 20 near the dental tray which is being adjusted by an operator. A dentist need only grasp the handle of the tray with the fingers of one hand and press on cap 172 with his thumb to release brake assembly 110. The tray can then be easily positioned. As soon as it is properly placed, release of cap 172 automaticaly results in air pressure being applied to brake assembly 110 and support arm 14 is locked in the the desired position.

A further feature of the present invention is that since only fricitional forces rigidly hold the parallelogram linkage, it is possible to incorporate an override feature by adjusting the pressure of the air to brake assembly 110. For example, by appropriately choosing the demensions of the brake shoes and the air pressure, a system can be overridden with about fifteen pounds of pressure exerted on the arm. This is an important safety consideration in the event a dentist or assistant inadvertently raises the dental chair when the dental tray is located over the patient. Absent such a feature a patient might be pinned between the chair and the support arm.

While this invention has been described with reference to specific embodiments thereof, it should be understood by those skilled in this art that various changes may be made and equivalents may be substituted without departing from the true spirit and scope of the invention. All such modifications are intended to be within the scope of the claims appended hereto.

What is claimed is:

1. A brake assembly for use with a tray support arm having a pair of first and second parallel members comprising:
    means releasably engaging a portion of the first of the parallel members, said engaging means comprising a first brake shoe adapted to engage a first portion of the first of the parallel members;
    means connecting said engaging means to the second of the parallel members, said connecting means being adapted for slidably connecting said first brake shoe with the second of the parallel members; and
    fluid operated means actuating said engaging means, whereby relative movement of the first and second parallel members is prevented when said actuating means causes said engaging means to engage said portion of the first of the parallel members.

2. The brake assembly of claim 1 wherein said connecting means is adapted for connecting said first brake shoe perpendicularly slidably with the second of the parallel members.

3. The brake assembly of claim 2 wherein said first brake shoe has a substantially planar portion for contacting said first portion of the first of said parallel members and an upstanding portion substantially perpendicular to said planar portion, said upstanding portion having an opening therein and said connecting means comprises a pin connected to the second of the parallel members and located within said opening.

4. The brake assembly of claim 3 wherein said engaging means comprises a second brake shoe adapted to contact a second portion of the first of the parallel members.

5. The brake assembly of claim 4 wherein said first and second brake shoes are positioned on opposed sides of the first of the parallel members.

6. The brake assembly of claims 4 or 5 wherein said actuation means comprises a flexible diaphragm.

7. The brake assembly of claim 6 wherein said actuation means further comprises a plate for supporting said second brake shoe, said plate being attached to said first brake shoe in a spaced relationship thereform, said diaphragm being located between said plate and said second brake shoe.

8. The brake assembly of claim 7 wherein at least one of said first and second brake shoes has a surface with a high coefficient of friction for engaging the first of the parallel members.

9. The brake assembly of claim 8 wherein said surface is formed from a rubber-like material.

10. The brake assembly of claim 8 wherein both of said first and second brake shoes have a surface with a high coefficient of friction for engaging the first of the parallel members.

11. A support arm for supporting an object at a multitude of positions comprising:
    a first elongate member;
    a second elongate member;
    means for connecting said first and second elongate members adjacent each end thereof in a substantially parallel configuration; and
    a brake assembly comprising:
        means releasably engaging a portion of said first elongate member, said engaging means comprising a first brake shoe adapted to engage a first portion of the first of said elongate members;
        means connecting said engaging means to the second of said elongate members, said connecting means being adapted for slidably connecting said first brake shoe with the second of said elongate members; and
        fluid operated means actuating said engaging means, whereby relative movement of the first and second elongate members is prevented when said actuating means causes said engaging means to engage said portion of said first elongate member.

12. The support arm of claim 11 wherein said means for connecting said first and second elongate members comprises a pair of first and second rigid members, said first rigid member being pivotably connected to said first and second elongate members adjacent one end thereof and said second rigid member being pivotably connected to said first and second elongate members adjacent to the other end thereof.

13. The support arm of claim 12 wherein said means for connecting said first and second elongate members comprises a first pivot block rigidly attached to said first elongate member adjacent one end thereof and pivotably connected to said first rigid member.

14. The support arm of claim 13 wherein said means for connecting said first and second elongate members comprises a second pivot block rigidly attached to said first elongate member adjacent the other end thereof and pivotably connected to said second rigid member.

15. The support arm of claim 12 wherein said first rigid member includes a portion thereof adapted for being rotatably received in a rigid support.

16. The support arm of claim 15 wherein said first rigid member incudes first stop means adapted to engage a portion of the rigid support at a selected position to prevent 360° rotatation of said first rigid member relative to the rigid support.

17. The support arm of claim 12 wherein said second rigid member includes a portion thereof adapted for rotatably supporting an object.

18. The support arm of claim 17 wherein said second rigid member includes second stop means adapted to engage a portion of the supported object at a selected position to prevent 360° rotation of a supported object relative to said second rigid member.

19. The support arm of claim 11 further comprising means for counteracting downwardly applied forces to said support arm.

20. The support arm of claim 19 wherein said counteracting means comprises a tension spring connected between one of said elongate members and said first rigid member.

21. The support arm of claim 20 wherein said tension spring is connected between said first elongate member and said first rigid member.

22. The support arm of claim 20 wherein the length of said tension spring is adjustable.

23. The brake assembly of any of claims 11–22 wherein said connecting means is adapted for connecting said first brake shoe perpendicularly slidably with the second of said elongate members.

24. The support arm of claim 23 wherein said first brake shoe has a substantially planar portion for contacting said first portion of said first elongate member and an upstanding portion substantially perpendicular to said planar portion, said upstanding portion having an opening therein and said connecting means comprises a pin connected to the second of said elongate members and located within said opening.

25. The support arm of claim 24 wherein said engaging means comprises a second brake shoe adapted to contact a second portion of said first elongate members.

26. The support arm of claim 25 wherein said first and second brake shoes are positioned on opposed sides of said first elongate member.

27. The support arm of claim 26 wherein said actuating means comprises a flexible diaphragm.

28. The support arm of claim 27 wherein said actuating means further comprises a plate for supporting said second brake shoe, said plate being attached to said first brake shoe in a spaced relationship therefrom, said diaphragm being located between said plate and said second brake shoe.

29. A support arm for supporting an object at a multitude of positions comprising:
an elongate member having two opposed, generally planar vertical sides and a generally planar crosspiece extending between said vertical sides, defining an upper channel and a lower channel;
a pair of parallel arms extending substantially the length of said crosspiece within said upper channel;
a pair of first and second rigid members pivotably connected between said pair of parallel arms and said crosspiece adjacent the ends thereof and maintaining said pair of parallel arms and said elongate member in a substantially parallel configuration; and
a brake assembly comprising a first brake shoe slidably connected to said pair of parallel arms, and fluid actuated means for releasably moving said first brake shoe into engagement with a portion of said crosspiece, whereby movement of said parallel arms and said crosspiece relative to each other is prevented when said first brake shoe is engaged with the portion of said crosspiece.

30. The support arm of claim 29 wherein said brake assembly includes a second brake shoe adapted to engage a second portion of said crosspiece.

31. The support arm of claim 30 wherein said first brake shoe is located within said upper channel and said second brake shoe is located within said lower channel in positions substantially opposed to each other on each side of said crosspiece, and said moving means is adapted to simultaneously move said first brake shoe and said second brake shoe into engagement with said crosspiece upon fluid actuation of said moving means.

32. The support arm of claim 31 wherein said moving means comprises a flexible diaphragm.

33. The support arm of claim 32 wherein the brake assembly includes a plate for supporting said second brake shoe, said plate being attached through said crosspiece to said first brake shoe in a spaced relationship therefrom, and said diaphragm being located between said plate and said second brake shoe.

34. The support arm of claim 33 further comprising means for counteracting downwardly applied forces to said support arm.

35. The support arm of claim 34 wherein said counteracting means comprises a tension spring.

36. The support arm of claim 35 wherein said tension spring is connected between said crosspiece and said first rigid member.

37. The support arm of claim 36 wherein the length of said tension spring is adjustable.

38. The support arm of claim 29 further comprising means for controlling said moving means.

39. The support arm of claim 38 wherein said control means normally causes said brake assembly to prevent relative movement of said parallel arms and said crosspiece.

40. The support arm of claim 38 wherein said control means is located at a position remote from said brake assembly.

41. The brake assembly of claim 5 comprising opening means disposed through said first of the parallel members, separating means disposed through said opening means, and second connecting means for connecting said first and second brake shoes together.

42. The support arm of claim 26 comprising opening means disposed through said first elongate member, separating means disposed through said opening means, and second connecting means for connecting said first and second brake shoes together.

* * * * *